United States Patent [19]

Jackman

[11] Patent Number: 4,504,856
[45] Date of Patent: Mar. 12, 1985

[54] STEREO TELEVISION SYSTEM

[75] Inventor: Earle G. Jackman, Sherburn County, Minn.

[73] Assignee: Honeywell Inc., Minneapolis, Minn.

[21] Appl. No.: 426,503

[22] Filed: Sep. 29, 1982

[51] Int. Cl.³ .............................................. H04N 9/54
[52] U.S. Cl. ..................................... 358/92; 358/237
[58] Field of Search .................. 358/88, 91, 92, 237, 358/236; 353/6, 7; 352/60, 62, 65

[56] References Cited

U.S. PATENT DOCUMENTS

| 2,665,335 | 1/1954 | Cahem | 358/92 |
|---|---|---|---|
| 3,191,493 | 6/1965 | Mainarde et al. | |
| 3,529,082 | 9/1970 | Hoesle | 358/92 |
| 3,737,567 | 6/1973 | Kratomi | 358/92 |
| 3,821,466 | 6/1974 | Roese | 358/92 |
| 3,858,001 | 12/1974 | Bonne | 358/92 |
| 3,903,348 | 9/1975 | Roese | 358/92 |
| 3,992,573 | 11/1976 | White | 358/92 |
| 4,153,334 | 5/1979 | Kato et al. | 350/132 |
| 4,214,267 | 7/1980 | Roese et al. | 358/88 |
| 4,424,529 | 1/1984 | Roese et al. | 358/88 |

Primary Examiner—John C. Martin
Assistant Examiner—Edward L. Coles
Attorney, Agent, or Firm—George W. Field

[57] ABSTRACT

Stereo television apparatus comprising, in combination: a projection television receiver for projecting light toward a screen as a sequence of images representative of a video signal comprising left and right video frames alternating at a predetermined frequency; apparatus dividing the light into first and second portions and directing the portions to fall successively on substantially the same area of the screen; and apparatus alternately rotating the planes of polarization of the portions in first and second opposite senses in synchronism with the predetermined frequency, so that when the screen is observed binocularly through eyepieces of oppositely rotated polarization, a stereo image is perceived by the observer.

5 Claims, 2 Drawing Figures

STEREO TELEVISION SYSTEM

TECHNICAL FIELD

This invention relates to the field of electro-optical communication, and particularly to apparatus by which stereo, or seemingly three-dimensional, images may be transmitted and received by television.

BACKGROUND OF THE INVENTION

It is known in the art to provide apparatus by which television images received at a local monitor may be given a three-dimensional appearance: one such arrangement is taught in Jurrison et al U.S. Pat. No. 4,286,286. In that system shuttering means are provided at the transmitter to alternately transmit signals representative of the appearance of a subject from two horizontally spaced viewpoints. The shuttering is correlated with the interlace components in the transmitted signal, and synchronized shuttering means are provided at the receiving monitor, to be worn as spectacles by the observer. The human brain functions, as is well known, to combine the rapidly alternating, slightly different right and left images to give the appearance of a three-dimensional image of the subject. The well known stereoscope of former decades is based on the same principal.

BRIEF SUMMARY OF THE INVENTION

The arrangement described above has certain disadvantages. The spectacles are somewhat heavy, and the shuttering means therein requires relatively high voltage to operate satisfactorily, thus providing a certain hazard to the user. In addition, the spectacles are expensive, and further each pair must be connected to the receiver by a cable, limiting the movement of the observer relative to the receiver.

The present invention makes use of plane polarized light to provide a system in which the observer's spectacles are light and inexpensive and contain eyepieces of polaroid with crossed axes. A projection television monitor is used, with a screen which does not disturb the plane of polarization of light falling on it. The system can be used with either monochrone or color installations.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
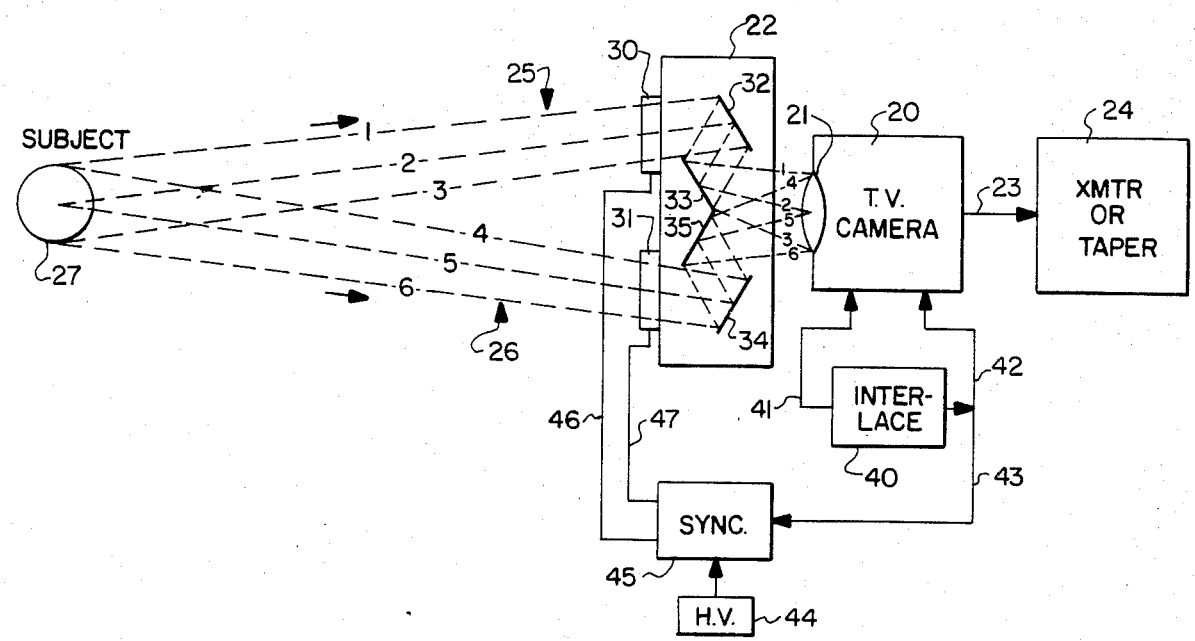
FIG. 1 shows in plan stereo television transmitting apparatus according to the invention.

In FIG. 1 a television camera 20, either monochrome or color, has a lens 21 which cooperates with a mirror box or periscope 22 to supply light to produce image signals, which are conducted on a link 23 to a transmitter or taper 24. Light reaches box 22 along two paths 25 and 26, which diverge from a subject 27. Mirror box 22 includes a pair of shutters 30 and 31 defining paths 25 and 26. A first pair of mirrors 32 and 33 direct light from path 25 to lens 24, and a second pair of mirrors 34 and 35 directs light from path 26 to lens 24 so that it falls on the same working area in camera 20. Conventional interlace circuitry 40 supplies a horizontal sweep to camera 20 on conductor 41, and supplies a vertical sweep to camera 20 on conductor 40: conductor 40 is extended at 43 to supply high voltage from a source 44 through a synchronizer 45, and energizes shutters 30 and 31 alternately through conductors 46 and 47.

While shutters 30 and 31 may be of any nature capable of opening and closing at the rate of 60 times per second, an electro-optical shutter is preferred. Such shutters are known, as disclosed in Applied Optics Volume 14, No. 8 (August 1975), and consist of thin transparent wafers of lanthanum modified lead zirconate titanate (PLZT), having interdigital electrodes vacuum deposited in mirror imaged fashion on the opposite surfaces. The wafers are mounted between crossed polarizers. When the proper electric field is applied between the electrodes, such a disk rotates the plane of polarization of the light from the first polarizer, which can then pass through the second polarizer. When the field is de-energized, the plane of polarization is not rotated and no light passes through the second polarizer.

The arrangement is such that shutter 30 is open only when shutter 31 is closed, and shutter 31 is open only when shutter 30 is closed. Accordingly the light reaching camera 20 comprises a train of alternate images from left and right viewpoints arranged to correspond with the normal human interoccular distance.

Figure 2:
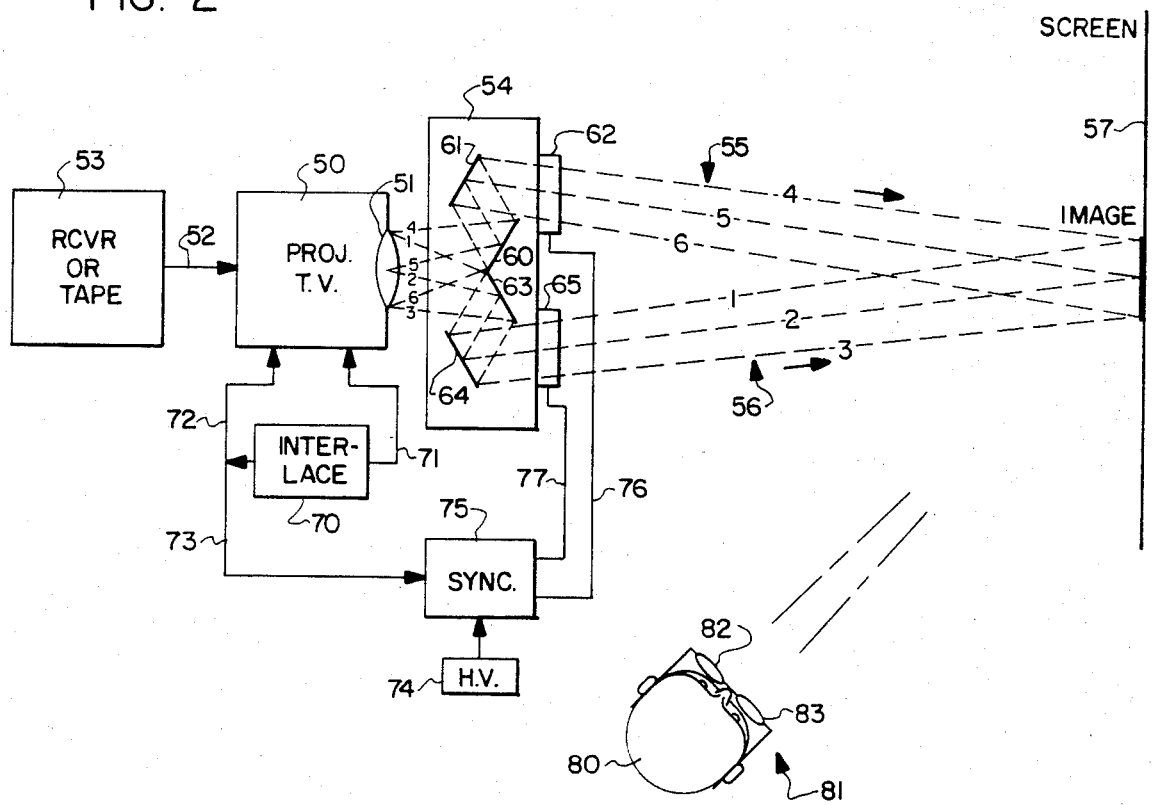
FIG. 2 shows in plan stereo television receiving apparatus according to the invention.

In FIG. 2 a projection television monitor 50 projects from a lens 51 images determined by the input 52 supplied by a television receiver or tape player 53.

A mirror box 54 cooperates with lens 51 to act as a beam splitter and divide the projected images into two beams 55 and 56 which fall on the same working area of a screen 57. Light for beam 55 is reflected by mirrors 60 and 61 and passes through a shutter 62, while light for beam 56 is reflected by mirrors 63 and 64 and passes through a shutter 65. The mirrors are such so that each beam covers the entire surface of lens 51.

Conventional interlace circuitry 70 supplies a horizontal sweep signal to monitor 50 on a conductor 71, and supplies a vertical sweep signal to monitor 50 on a conductor 72; conductor 72 is extended at 73 to supply a high voltage from source 74 through a synchronizer 75 and energizes shutters 62 and 65 alternately through conductors 76 and 77. Shutters 62 and 65 are like shutters 30 and 31 previously described, except at the second polarizer is omitted from each. Beams 55 and 56 are thus plane polarized light, the planes of polarization being rotated by 90° depending on whether shutters 62 and 65 are energized or not, and screen 57 is of such a nature as to reflect light falling on it without alternating its state of polarization. An observer 80 is provided with viewing apparatus 81 in the form of a pair of light spectacles having left and right eyepieces containing polaroid material positioned in 90° relation, so that light which is polarized to pass left eyepiece 82 will not pass right eyepiece 83 and vice versa.

OPERATION

The operation of the invention is as follows. During a first interval right camera shutter 30 is open and left shutter 31 is closed, so light from the right hand viewpoint, beam 25, reaches camera 20 and a resultant image signal is created, combined with an interlace signal, and the composite signal is supplied at 23 to transmitter 24. At the receiver the image signal is projected from lens 51, and the interlace signal acts to open shutter 62, shutter 65 remaining closed. The observer's eyepieces are so oriented that the light from shutter 62, reflected from screen 57, is transmitted by eyepiece 83, and blocked by eyepiece 82.

At the next interval shutter 31 is open and shutter 30 is closed, so light from the left hand viewpoint, beam 26, reaches camera 20. A resultant image signal is created, combined with an interlace signal, and the composite signal is supplied at 23 to transmitter 24. At the receiver the image signal is projected from lens 51, and the interlace signal acts to open shutter 65, shutter 62 remaining closed. The observer's eyepiece 82 transmits the light reflective from screen 57 and eyepiece 83 blocks the light.

From the above it will be apparent that the invention comprises a stereo television system in which an observer is free to move with respect to a projection television monitor, and is not connected thereto by any wire. The observer wears simple inexpensive spectacles in which the eyepiece are a polaroid, and can move freely with respect to the monitor.

Numerous characteristics and advantages of the invention have been set forth in the foregoing description of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The characteristics of the invention in which an exclusive property or right is claimed are as follows:

1. Stereo television apparatus comprising, in combination: means for presenting to a single television camera, light, from a subject, reaching first and second mutually spaced sites, means for alternately interrupting the light from said sites in a continuous succession at a predetermined frequency, to produce a video signal comprising trains of video frames in stereo relationship;
    a television receiver projecting light toward a screen to produce thereon images determined by said video frames;
    and means including a beam splitter between the receiver and the screen for alternately and oppositely rotating the planes of polarization of the projected light at said predetermined frequency,
    so that when said screen is observed binocularly through eyepieces of oppositely rotated polarization, a stereo image is perceived by the observer.

2. Apparatus according to claim 1 in which the last name means includes a beam splitter, a pair of light polarizers in mutually 90° relationship, means directing a pair of beams from said beam splitter through said polarizers to substantially the same area of the screen, a pair of shutters between said polarizers and said screen, and means actuating said shutters alternately at said frequency.

3. Apparatus according to claim 2 in which the shutters are electro-optical.

4. Apparatus according to claim 2 in which the shutters are PLZT ceramic.

5. Stereo television apparatus comprising, in combination:
    a projection television receiver for projecting light toward a screen as a sequence of images representative of a video signal comprising left and right video frames alternating at a predetermined frequency;
    means dividing said light into first and second portions and directing said portions to fall successively on substantially the same area of the screen;
    and means alternately rotating the planes of polarization of said portions in first and second opposite senses in synchronism with said predetermined frequency,
    so that when said screen is observed binocularly through eyepieces of oppositely rotated polarization, a stereo image is perceived by the observer.

* * * * *